United States Patent
Holzer-Popp et al.

(10) Patent No.: US 6,484,099 B1
(45) Date of Patent: Nov. 19, 2002

(54) PROCESS FOR CORRECTING ATMOSPHERIC INFLUENCES IN MULTISPECTRAL OPTICAL REMOTE SENSING DATA

(75) Inventors: Thomas Holzer-Popp, Diessenn (DE); Michael Bittner, Untermuhlhausen (DE); Erik Borg, Joachimsthal (DE); Stefan Dech, Gilching (DE); Thilo Ebertseder, Munich (DE); Bernd Fichtelmann, Neustrelitz (DE); Marion Schroedter, Gilching (DE)

(73) Assignee: Deutsches Zentrum fur Luft -und Raumfahrt e.V., Bonn (DE)

( * ) Notice: Subject to any disclaimer, the term of this patent is extended or adjusted under 35 U.S.C. 154(b) by 272 days.

(21) Appl. No.: 09/617,542

(22) Filed: Jul. 14, 2000

(30) Foreign Application Priority Data

Jul. 16, 1999 (EP) .......................... 99 113 927

(51) Int. Cl.⁷ .............................................. G06F 19/00
(52) U.S. Cl. ............................................. 702/2; 702/5
(58) Field of Search ..................... 702/2, 3, 5; 382/103; 348/144, 145, 146, 147

(56) References Cited

U.S. PATENT DOCUMENTS 5,324,113 A * 6/1994 Ingram et al. .................. 702/2
6,356,646 B1 * 3/2002 Spencer ....................... 348/144

FOREIGN PATENT DOCUMENTS

DE         4102579        8/1991

OTHER PUBLICATIONS

Heinzelmann, "Photogrammetrie–Know–how– für Fernerkundung und Robotik," Technische Rundschau, 1993, 40–45, 22.

Bijker, et al. "A Remote Sensing Monitoring System for a Settlement Area in Tropical Rain Forest," Proceedings of the International Geoscience and Remote Sensing Symposium, 1994, 97–99, New York, USA.

* cited by examiner

Primary Examiner—Donald E. McElheny, Jr.
(74) Attorney, Agent, or Firm—Browdy and Neimark

(57) ABSTRACT

The inventive process for correcting atmospheric influences in multispectral optical remote sensing data, which are acquired as raw data in satellite or airborne sensors for earth observation, comprises the combination of a pre-classification (DERA) of the raw data for an automatic identification of predefined classes, a correction calculation (CORA) for a conversion of the uncorrected to corrected reflectances on the ground, including an incorporation of current atmospheric data for a precise description of the atmospheric condition. The pre-classification (DERA) permits a more precise correction calculation (CORA) by generating required a priori knowledge. The method has applications in satellite or airborne remote sensing of the earth's surface.

30 Claims, 1 Drawing Sheet

PROCESS FOR CORRECTING ATMOSPHERIC INFLUENCES IN MULTISPECTRAL OPTICAL REMOTE SENSING DATA

BACKGROUND OF THE INVENTION

1. Technical Field of the Invention

The present invention relates to a process for correcting atmospheric influences in multispectral optical remote sensing data that are acquired in different types of satellite or airborne sensors for earth observation with different geometric and/or spectral resolutions, and read in and precessed as raw data to generate an image.

2. Prior Art

A fundamental prerequisite for deriving quantitative parameters and indicators from remotely sensed data, apart from geo-referencing, is the atmospheric correction.

A number of basic processes for the atmospheric correction of multispectral remote sensing data already exists. However, some of these processes are only on a scientific level of development (laboratory samples, e.g., H. Rahman, G. Dedieu: "SMAC", A simplified method for atmospheric correction of satellite measurements in the solar spectrum, Int. J. Rem. Sens., 15, 1, pages 123–143, 1994, and "EXACT", Th. Popp: Correcting atmospheric masking to retrieve the spectral albedo of land surfaces from satellite measurements, Int. J. Rem. Sens., 16, pages 3483–3508, 1995), which does not permit a routine automatic processing of multispectral remote sensing data from a great variety of sensors.

Then there are processes that are currently being used as industrial samples in commercial program packages for the atmospheric correction of multispectral remote sensing data, one of which is known from DE 41 02 579 C2. They are based on the determination of reference areas of a low reflectance, which must be identified in the remotely sensed data. The criteria that are used for these reference areas may be the grey value, the color, or the multispectral signature. The calculation of the atmospheric correction furthermore requires that the properties of the atmosphere in need of correction be known. As a rule, this is done by entering pre-set standard atmospheres. These processes, which are being used as industrial samples, require the interactive interaction, for example for the selection of reference areas and atmospheric parameters, by an expert who must possess specialized knowledge and experience in the field of atmospheric correction. These processes, therefore, cannot be used for an automatic atmospheric correction of remotely sensed data.

In the commercially applied industrial sample processes, the atmospheric correction is performed manually through interactive parameter adjustments and, as a rule, this is done using predefined standard information, e.g., in the form of a limited number of standard atmospheres and/or a predefined visibility. Selecting the best-suited standard information for the given remotely sensed data set being processed requires expert knowledge on the part of the operating personnel. Furthermore, until now there is no automatic identification of validation areas, e.g., of reference areas of a low reflectance and of areas of known reflectance behavior. These areas are currently also identified and marked interactively by the operating personnel.

The aforementioned scientific processes in the form of known laboratory samples are generally optimized with respect to a specific sensor or even to a specific application, or they utilize only supplemental data that are poorly correlated with respect to time/space, e.g., climatologies and weather analysis data.

Furthermore, in the known industrial samples and most laboratory samples, the anisotropy of the reflectance on the ground is not taken into consideration. A further, hitherto unsolved problem in the processing of remotely sensed data lies in the fact that, while it is true that measurements of the current atmospheric condition can be incorporated for the correction of individual data sets, as a rule, a large-scale incorporation of current atmospheric parameters can not take place within these processes.

The influence of the non-inclusion of the atmospheric parameters can be demonstrated, for example, for the so-called normalized differential vegetation index (NDVI). The NDVI is obtained from bi-spectral measurements in the red (channel 1) and in the near-infrared (channel 2) and represents a standard value which, because of the method by which it is calculated, already provides a correction of the zeroth order of the atmospheric influence. The following table provides an overview of the possible influence of the most important atmospheric parameters (ozone, water vapor, molecule or Rayleigh scattering, aerosol scattering) on data of the spectral reflectance and the NDVI based on the example of a known sensor (NOAA-AVHRR) and thus demonstrates the errors that can still be attached to this correction of the zeroth order if current atmospheric parameters are not used for the atmospheric correction. The proportional effects (transmission) are listed in the table in percentages and other information in absolute reflectances.

TABLE

| | Ozone 250–500 [D. U.] | Water Vapor 0.5–4.0 [g/cm$^2$] | Rayleigh 1013.25 hPa | Aerosol Continental $\tau_{550\,nm}$ = 0.05–0.8 |
|---|---|---|---|---|
| Channel 1 | – | – | + | + |
| 620 ± 120 nm | 4–13.5% | 0.7–4.4% | 0.018–0.07 | 0.005–0.12 |
| Channel 2 | – | – | + | + |
| 885 ± 195 nm | 0.02–0.5% | 7.7–22% | 0.006–0.04 | 0.003–0.083 |

TABLE-continued

| | Ozone 250–500 [D. U.] | Water Vapor 0.5–4.0 [g/cm$^2$] | Rayleigh 1013.25 hPa | Aerosol Continental $\tau_{550\,nm}$ = 0.05–0.8 |
|---|---|---|---|---|
| NDVI 0.05 (bare ground) $\rho 1 = 0.19/\rho 2 = 0.21$ | + 0.02–0.07 | − 0.011–0.12 | − 0.036–0.094 | − 0.006–0.085 |
| NDVI 0.85 (deciduous forest) $\rho 1 = 0.03/\rho 2 = 0.36$ | + 0.006–0.017 | − 0.036–0.038 | − 0.086–0.26 | − 0.022–0.34 |

OBJECT AND SUMMARY OF THE INVENTION

The present invention is based on the aim of creating a process for correcting atmospheric influences for multispectral remote sensing data that is suitable for integration into an automatic processing chain and, in contrast to processes of the prior art, therefore meets important criteria in such a way that current reference areas are determined automatically and current atmospheric parameters are used, that no interactive involvement of the operating personnel must be required, and that no expert knowledge should be required on the part of the operating personnel.

In accordance with the invention, which relates to a process of the above type, this aim is met in such a way that in a first partial process, a pre-classification of the raw data takes place for an automatic recognition of predefined classes, that, in a second partial process, a correction calculation is performed to convert the uncorrected reflectances into corrected reflectances on the ground, and that current and essentially complete supplementary data on the current atmospheric conditions are incorporated. The pre-classification permits a more precise correction calculation by generating required a priori knowledge.

Pre-tabulated/parameterized radiative transfer calculations make the inventive process fast and, therefore, suitable for operational applications. To attain a good time-space correlation of the atmospheric data with the data in need of correction, these values are estimated, as far as possible, from the data in need of correction. Additional supplementary data that cannot be obtained from the data in need of correction can be acquired externally from operational processing chains via an external interface, and interpolated with suitable methods.

In the numerical process for an automatic atmosphere correction according to the invention, the data from different sensors with different geometric and/or spectral resolution may be read in and processed as raw data, e.g, NOAA-AVHRR, ERS-ATSR, (SEA)WIFS, EOS-MODIS, Landsat-TM and Landsat-MSS, IRS-LISS, SPOT-HRV. Essential in the inventive process is the combination of an event-controlled classification and object identification, i.e., a localization and content-based correlation of objects, the actual correction calculation, and the use of current and complete supplementary data regarding the atmospheric condition. Only with this combination can an automatic atmospheric correction take place without interactive intervention or expert knowledge.

The inventive process is, therefore, composed of two partial processes, which can be advantageously joined as main modules. The first main module is used for the detection and identification of dark areas and areas of significant spectral behavior in the remotely sensed data, and the second main module is used for the atmospheric correction of the remotely sensed data.

The two main modules advantageously consist of sub-modules. These are advantageously supplemented by a database in which basic static and dynamic data, as well as a priori knowledge, e.g., spectral signatures, sensor specifications, statistical properties, correction methods and assimilation methods are stored. This database is accessible by both main modules.

The first main module for its part advantageously consists of two sub-modules. The first of these two sub-modules is used for the identification of reference areas of low reflectance, e.g., of water surfaces and dark forest areas, as well as for the identification of exclusion areas, e.g., clouds and cloud shadows. In the process, this sub-module uses the model spectra and sensor-specific information stored in the database. The second one of these two sub-modules is used to perform the homogeneity analysis for identified reference areas (test for representativeness of the selected areas) and the area size analysis, on one hand, and the analysis of the direct and indirect neighbourhood on the other hand.

The second main module, which is thus used for the atmospheric correction of the remotely sensed data, for its part advantageously also consists of two sub-modules. The first one of these two sub-modules is used for processing the required supplementary data. In the process, this sub-module accesses internal supplementary data, as they are derived from the raw data and the results from the first main module, and processes external supplementary data, which are made available via an external interface, e.g., online or via CD-ROM. This may be done using standard data assimilation and interpolation methods, which are made available in the methods database. The second one of these two sub-modules performs the actual correction steps with the aid of the supplementary data from the first sub-module. In the process, correction methods may be accessed that are stored in the methods database.

BRIEF DESCRIPTION OF THE DRAWINGS

The inventive process for correcting atmospheric influences in multispectral optical remote sensing data will be explained in detail below, based on FIG. 1 which gives a schematic overview.

DETAILED DESCRIPTION OF THE PREFERRED EMBODIMENT(S) OF THE INVENTION

Figure 1:
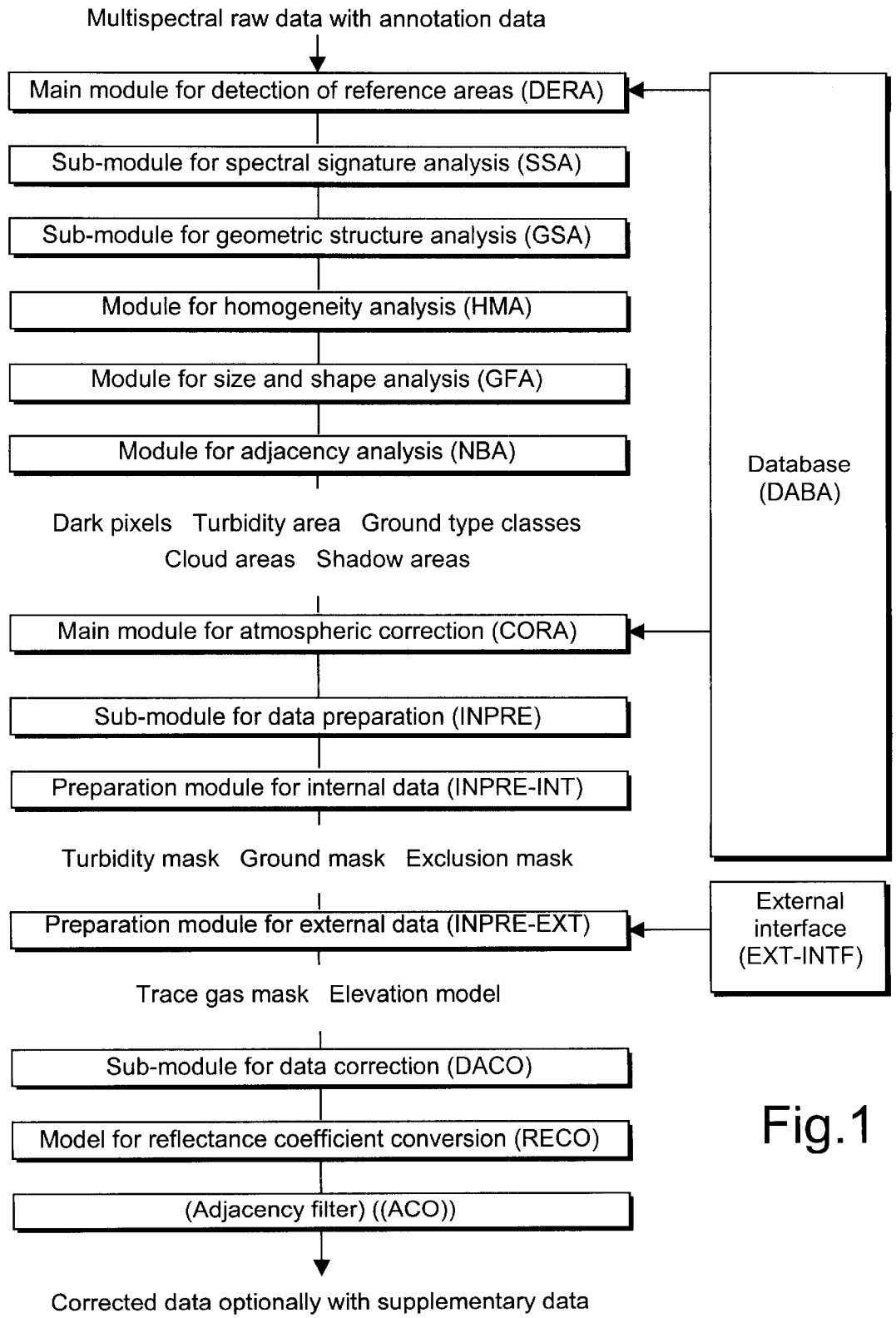

The process shown in the FIGURE for an automatic atmospheric correction according to the invention consists of two different partial processes, which are combined as main modules DERA and CORA. The main module DERA ("Detection of Reference Areas") is used for the detection and identification of dark areas and areas of significant spectral behavior in the remotely sensed data, and the main module CORA ("Correction of Atmosphere") is used for the atmospheric correction of the remotely sensed data. Both main modules DERA and CORA access a database DABA with stored methods and parameters. The process provides the result in the form of a pixel image of the atmosphere-corrected ground reflectance with incorporated supplementary atmospheric data, anisotropic reflectance characteristics of different ground type classes, and terrain elevation. Data from different sensors with different geometric and/or spectral resolutions can be read in as raw data and processed.

The main module DERA consists of two sub-modules SSA ("Spectral Signature Analysis") and GSA ("Geometric Structure Analysis"). The spectral signature analysis in the sub-module SSA is aimed at an analysis of the spectral behavior of the multispectral data set on the pixel level. The data from different sensors and/or different geometric resolutions can be read in and processed as raw data. In the process, the pixels of the remotely sensed data set are assigned to the probably detected remotely sensable objects in reality on the basis of generalized model spectra for remotely sensable objects on the pixel level. The model spectra that are required for this analysis are stored in the database DABA, which is used by the algorithm to be executed in the sub-module SSA. Also stored in the database are the sensor specifications that are required for this analysis, which are made available as a priori knowledge.

On the basis of this information and the spectral behavior of the individual pixels, they are assigned to suitable reference areas, which may serve as dark areas. They furthermore form the basis for the assignment of a ground type class (forest, grassland, bog, savannah, uncultivated field, bushland, water, residential settlement, rock, sand), based on which a suitable function for modeling the anisotropic ground reflectance can be selected in the main module CORA.

The sub-module GSA is used for the homogeneity analysis of identified reference areas, for the area size analysis, as well as for the analysis of the direct and indirect neighbourhood. The data areas detected by the sub-module SSA used for the spectral signature analysis are routed to the sub-module GSA used for the geometric structure analysis, and examined for sufficient size. The geometric structure analysis that is performed in the sub-module GSA, in turn, is divided into a module HMA used for the homogeneity analysis, a module GFA used for the size and shape analysis of identified data areas, and a module NBA used for the neighbourhood analysis.

The module HMA for the homogeneity analysis is used for the identification of contiguous areas, or areas that must be treated separately during the further image processing. This is done by examining image areas for their local homogeneity with a filter matrix (m☐m) and comparing them to threshold values. The measure for the homogeneity, which is then made available as the threshold value for the data set, is derived directly from the data. For this purpose the data set is divided into data sectors and subjected to a statistical analysis with filters of decreasing sizes. The mean value, the standard deviation, as well as the variation coefficient are derived as statistical measures.

In the next module GFA used for the size and shape analysis of the identified data areas, an object identification is assigned to these areas, so that the shape parameters can be directly assigned to the objects. For this purpose, the size of the area and the circumference and compactness of the objects are determined, so that a criterion is derived for the evaluation of the objects as reference areas.

Decision criteria for reference areas are defined as follows: reflectance value below a maximum size in the mid-infrared or, alternatively, near-infrared value below a spectral threshold in combination with exceeding a minimum value for a vegetation index, and, additionally, exceeding a minimum area size.

The direct and indirect neighbourhood of the data regions identified as homogenous is subsequently analyzed by the module NBA used for the neighbourhood analysis. The goal of this analysis is to identify so-called mixed pixels and interference pixels, which must be treated separately with respect to their belonging to the adjacent objects to be able to assign to them a suitable ground type class. For this purpose the data are analyzed, with filters of decreasing sizes, with respect to the transition contrasts between the identified data sectors, in order to thus be able to estimate e.g., the influence of clouds or haze and to separate phenomena of different length scales (e.g., small-scale variability of the land use from large-scale change in the atmospheric conditions).

The main module CORA consists of two sub-modules INPRE ("Input Preparation") and DACO ("Data Correction").

The sub-module INPRE is aimed at making the required supplementarydata for the sub-module DACO available for each pixel and it is divided into two preparation modules INPRE-INT and INPRE-EXT. In the process, the module INPRE-INT uses; results from the first main module DERA (internal supplementary data); the module INPRE-EXT processes the atmospheric data (external supplementarydata) that are made available via an external interface EXT-INTF (online or from CD-ROM, e.g., from the German Remote Sensing Data Center, DFD). In the process, the sub-module INPRE determines the following supplementary data for each pixel: turbidity mask, ground mask and exclusion mask (INPRE-INT), trace gas masks and terrain model (INPRE-EXT).

With the module INPRE-INT, the aerosol-optical thickness in visible channels above the reference areas determined by the first main module DERA is determined by means of a dark field method and transferred, with suitable interpolation routines, from the database DABA to all pixels and spectral channels (turbidity mask). During the spatial interpolation, the contiguous areas of similar atmospheric conditions that were determined by the first main module DERA are taken into consideration. The ground type class determined by the first main module DERA is used to select the suitable model function of the anisotropic reflectance properties (ground mask). Cloud and shadow areas determined by the first main module DERA are annotated as "pixels not to be corrected (exclusion mask).

Via the online interface EXT-INTF or via CD-ROM, satellite or airborne data of total ozone column and water vapor column (e.g., from the German Remote Sensing Data Center, DFD) are loaded by the module INPRE-EXT and converted with suitable assimilation processes (e.g., Harmonic analysis, Kalman filter, Kriging) from the database DABA to the point in time/geographical location of the raw data (trace gas masks). A suitable section of a digital elevation model is acquired via the same interface and re-projected to the sensor coordinates.

The sub-module DACO performs the pixel-by-pixel correction of all non-excluded pixels (exclusion mask) with the aid of the supplementary data (masks) from the sub-module INPRE. In the process access is made, as desired, to quick correction methods from the database DABA (by means of known radiation transportation programs, e.g., 6S, SOS, MODTRAN calculated lookup tables, or published parameterization schemes, e.g., SMAC, EXACT).

The sub-module DACO first performs, for each pixel of the raw data, a conversion of the value measured at the top of the atmosphere into a reflectance value on the ground using a module RECO (Reflectance Conversion). The pixel values of the turbidity mask, the ground mask, the trace gas mask and the elevation model are used in the process as supplementary data. The sub-module DACO incorporates the anisotropy of the reflectance from the earth's surface by using a suitable model function for each of the ground types determined from the main module DERA.

For the correction of the incident radiation into the instantaneous field of view of the sensor from adjacent pixels a simple adjacency filter is applied in a module ACO ("Adjacency Correction") using the turbidity mask. This is done in a second step, which, however, is necessary only for high-resolution sensors.

The modules access the methods and parameters database DABA. In this database, data (sensor parameters, model spectra, aerosol models, anisotropy types, atmospheric models) are available together with methods (radiative transfer methods, parameterization schemes, assimilation and interpolation methods).

The raw data must be roughly (approximately ±1 pixel or ±degree) annotated with the geographic position (geographic longitude, geographic latitude) and the observation geometry (observation zenith, observation azimuth) of each individual pixel; only "nearest neighbor" methods should be used as interpolation methods, if need be. The raw data must be multispectral and have at least one visible and one near-infrared channel. The optimum is an additional channel in the medium infrared (more exact dark field method) and a further channel in the visible (more precise spectral interpolation of the aerosol optical thickness.) Together with the observation data the precise observation time must be made available, to be able to calculate the position of the sun. Alternately, the zenith and azimuth angle of the sun may be provided for each pixel as an additional channel.

LIST OF REFERENCE NUMERALS

ACO Adjacency filter
CORA Main module for atmospheric correction
DABA Database
DACO Sub-module for data correction
DERA Main module for detection of reference areas
EXT-INF External interface
GFA Module for size and shape analysis
GSA Sub-module for geometric structure analysis
HMA Module for homogeneity analysis
INPRE Sub-module for data preparation
INPRE-INT Preparation module for internal data
INPRE-EXT Preparation module for external data
NBA Module for adjacency analysis
RECO Model for reflectance coefficient conversion
SSA Sub-module for spectral signature analysis

What is claimed is:

1. A process for correcting atmospheric influences in multispectral optical remote sensing data that are acquired by different satellite or airborne sensors for earth observations with different geometric and/or spectral resolutions, and read in and processed as raw data to generate an image, comprising the steps of:
pre-classification of the raw data for an automatic recognition of pre-defined classes performing in a first partial process; and
performing a correction calculation to convert the uncorrected reflectances into corrected reflectances on the ground in a second partial process; and
incorporating into the process current and essentially complete supplementary data on the current atmospheric conditions.

2. A process according to claim 1, comprising the further step of:
accessing a database (DABA) with methods and parameters in said first partial process and said second partial process.

3. A process according to claim 1, comprising the further steps of:
performing each of the first partial process and the second partial process in a module and joining each said module as a main module (DERA, CORA).

4. A process according to claim 3, wherein a first main module (DERA), carries out the first partial process, and detects and identifies dark areas and areas of significant spectral behavior in raw remote sensing data, and a second main module (CORA) carries out the second partial process and correct calculations.

5. A process according to claim 4, wherein the first main module (DERA) consists of two sub-modules (SSA, GSA), a first one (SSA) of which is responsible for a spectral signature analysis and a second one (GSA) for a geometric structure analysis, wherein data from different sensors with different geometric and/or spectral resolutions are read as raw data into the first sub-module (SSA), which is aimed at an analysis of the spectral behavior on the pixel level, and processed, and an assignment of the pixels of read-in remotely sensed data set to probably detected remotely sensable objects in reality is made on the basis of generalized model spectra for remotely sensable objects on a pixel level, in such a way that model spectra required for this analysis are stored in the database (DABA), which is accessed during the first partial process, and that in the second sub-module (GSA) of the first main module (DERA) a homogeneity analysis of identified reference areas, an area size analysis, as well as an analysis of the direct and indirect neighbourhood is performed in such a way that data areas that were detected by the first sub-module (SSA) are routed to the second sub-module (GSA) and examined for sufficient size.

6. A process according to claim 5, wherein the second sub-module (GSA) of the first main module (DERA) is divided into a homogeneity analysis module (HMA), a size and shape analysis module (GFA) for identified areas, and an neighbourhood analysis module (NBA), wherein the homogeneity analysis module (HMA) performs an identification of contiguous areas and/or areas that need to be treated separately in the further image processing, that an object identification is assigned to the identified data areas by the size and shape analysis module (GFA) so that the shape parameters can be directly assigned to the objects, and that the neighbourhood analysis module (NBA) performs an analysis of the direct and indirect neighbourhood of the data regions identified as homogenous, in such a way that the goal of the analysis lies in the identification of so-called mixed and interference pixels that must be treated separately with respect to belonging to the adjacent objects, in order to be able to assign thereto a suitable ground type class.

7. A process according to claim 6, wherein in the homogeneity analysis module (HMA), image areas are examined with a filter matrix (m□m) for their local homogeneity and compared to threshold values in such a manner that a measure for the homogeneity, which is then made available as the threshold value for the data set, is derived directly from the data, and that the data set is divided into data sectors for this purpose and statistically analyzed with filters of decreasing size, in such a manner that the mean value, the standard deviation and the variation coefficient are derived as statistical measures.

8. A process according to claim 6, wherein in the size and shape analysis module (GFA), an area size, the circumference and the compactness of the objects are determined, so that a criterion is derived for evaluating the objects as reference areas.

9. A process according to claim 8, wherein the decision criteria for reference areas are defined as the differentiation of a maximum size for the reflectance in the mid-infrared spectrum or, alternately, a near-infrared value below a spectral threshold, in combination with exceeding a minimum value for a vegetation index and, additionally, exceeding a minimum area size.

10. A process according to claim 6, wherein in the adjacency module (NBA), an analysis of the data is performed with filters of decreasing size with respect to the transition contrasts between identified data sectors, in order to thus be able to estimate the influence of clouds or haze, and to be able to separate phenomena of different length scales, e.g., small-scale variability of the land use from large-scale changes in the atmospheric conditions.

11. A process according to claim 4, wherein the second main module (CORA) consists of two sub-modules (INPRE, DACO), wherein a processing of the required supplementary data is performed in first sub-module (INPRE) in such a manner that internal supplementary data as they are derived from the raw data and results from the first main module (DERA), are accessed in a first preparation unit (INPRE-INT), and external supplementary data, which are provided via an external interface (EXT-INTF), are processed in a second preparation unit (INPRE-EXT) in such a manner that standard data assimilation and interpolation methods are used, which are made available in the database (DABA) as methods, and that the actual correction steps are performed in a second sub-module (DACO) of the second main module (CORA) with the aid of the supplementarydata from the first sub-module (INPRE) in such a way that correction processes are accessed in a method-containing database (DABA).

12. A process according to claim 11, wherein in the first sub-module (INPRE) of the second main module (CORA), a turbidity mask, a ground mask and an exclusion mask are determined for each pixel in the first preparation unit (INPRE-INT), and trace gas masks and a terrain model are determined in the second preparation unit (INPRE-EXT).

13. A process according to claim 12, wherein with the first preparation unit (INPRE-INT), an aerosol-optical thickness in visible channels above the reference areas determined by the first main module (DERA) is determined by means of a dark field method and transferred to all pixels and spectral channels with suitable interpolation routines from the database (DABA) to form the turbidity mask, and that the contiguous areas of similar atmospheric conditions determined by the first main module (DERA) are incorporated into the spatial interpolation.

14. A process according to claim 12, wherein a ground type class determined by the first main module (DERA) is used in the first preparation unit (INPRE-INT) for the selection of a suitable model function of the anisotropic reflectance characteristics in the generation of a ground mask.

15. A process according to claim 12, wherein cloud and shadow areas determined by the first main module (DERA) are annotated in the first preparation unit (INPRE-INT) during the generation of the exclusion mask as pixels that are not to be corrected.

16. A process according to claim 12, wherein for generation of the trace gas masks, satellite or airborne data of total ozone column and water vapor column are loaded by the second preparation unit (INPRE-EXT) via an interface (EXT-INTF) e.g., an online interface or via CD-ROM, and converted to the time/geographic location of the raw data by means of suitable assimilation methods, such as Harmonic analysis, Kalman filter or Kriging from the database (DABA).

17. A process according to claim 12, wherein via an interface that is or may be identical to the interface of claim 16, a suitable section of a digital elevation model is acquired by the second preparation unit (INPRE-EXT) and re-projected to the sensor coordinates.

18. A process according to the claim 11, wherein in the second sub-module (DACO) of the second main module (CORA), the correction of all pixels not excluded by the exclusion mask is performed pixel by pixel with the aid of the supplementary data from the first sub-module (INPRE) of the second main module (CORA).

19. A process according to claim 18, wherein access is made, as desired, during correction to fast correction methods from the database (DABA), particularly to known radiation transportation programs, such as 6S, SOS, MODTRAN-calculated lookup tables or published parameterization schemes, e.g., SMAC, EXACT.

20. A process according to claim: 19, wherein in the second sub-module (DACO) of the second main module (CORA), a conversion (RECO) of the value measured at the top of the atmosphere is performed for each pixel of the raw data into a reflectance value on the ground in such a manner that the pixel values of the turbidity mask, the ground mask, the trace gas mask and the elevation model are used as supplementary data, and that the anisotropy of the reflectance from the ground is incorporated by the second sub-module (DACO) of the second main module (CORA) by using a suitable model function for each ground type determined from the first main module (DERA).

21. A process according to the claim 18, wherein when high-resolution sensors are used, a simple filter using the turbidity mask is additionally used, in a second step, in the second sub-module (DACO) of the second main module (CORA) for correction of incident radiation into the instantaneous field of view of a sensor from adjacent pixels.

22. A process according to claim 2, wherein in the database (DABA) for methods and parameters, data are available regarding sensor parameters, model spectra, aerosol models, anisotropy types, atmosphere models, together with methods regarding radiative transfer methods, parametrization schemes, assimilation and interpolation methods.

23. A process according to claim 12, wherein a pixel image of the-atmosphere-corrected ground reflectance is obtained with incorporated supplementary atmospheric data, anisotropic reflectance characteristics of various ground type classes, and terrain elevation.

24. A process according to claim 12, wherein the raw data are roughly (approximately ±1 pixel or ±1 degree) annotated with the geographic position (geographic longitude, geographic latitude) and the observation geometry (observation zenith, observation azimuth) of each individual pixel.

25. A process according to claim 12, wherein the multispectral raw data have at least one visible and one near infrared spectrum.

26. A process according to claim 25, wherein one additional channel in the middle infrared spectrum is provided for a more precise dark field method, and a further channel in the visible light spectrum is provided for a more precise spectral interpolation of the aerosol optical thickness.

27. A process according to claim 4, wherein an exact time an observation is made available with the observation data for the calculation of the given position of the sun.

28. A process according to claim 12, wherein a current zenith and azimuth angle of the sun is provided for each pixel as an additional channel.

29. A process according to claim 1, wherein atmospheric influences in multispectral thermal remote sensing data are corrected.

30. A process according to claim 2, comprising further steps of:
performing each of the first partial process and the second partial process in a module and joining each said module as a main module (DERA, CORA).

* * * * *